United States Patent
Hayashi et al.

(10) Patent No.: US 9,360,941 B2
(45) Date of Patent: Jun. 7, 2016

(54) INFORMATION PROCESSING APPARATUS, PROJECTION SYSTEM, AND INFORMATION PROCESSING METHOD

(71) Applicants: Yuuichiroh Hayashi, Kanagawa (JP); Kazuhiro Takazawa, Tokyo (JP); Satoshi Mitsui, Kanagawa (JP)

(72) Inventors: Yuuichiroh Hayashi, Kanagawa (JP); Kazuhiro Takazawa, Tokyo (JP); Satoshi Mitsui, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 276 days.

(21) Appl. No.: 13/874,648

(22) Filed: May 1, 2013

(65) Prior Publication Data

US 2013/0307774 A1 Nov. 21, 2013

(30) Foreign Application Priority Data

May 16, 2012 (JP) ................................. 2012-112786

(51) Int. Cl.
*G06F 3/01* (2006.01)
*G06F 21/31* (2013.01)
*G06F 21/32* (2013.01)
*G06F 21/62* (2013.01)

(52) U.S. Cl.
CPC .............. *G06F 3/017* (2013.01); *G06F 21/316* (2013.01); *G06F 21/32* (2013.01); *G06F 21/629* (2013.01)

(58) Field of Classification Search
CPC ........................................................ G06F 3/017
See application file for complete search history.

(56) References Cited

U.S. PATENT DOCUMENTS

| 2009/0235344 | A1 | 9/2009 | Ohzaki et al. | |
| 2010/0083373 | A1* | 4/2010 | White et al. | 726/21 |
| 2011/0154266 | A1* | 6/2011 | Friend et al. | 715/863 |
| 2013/0007616 | A1* | 1/2013 | Bell | G06F 3/017 |
| | | | | 715/709 |

FOREIGN PATENT DOCUMENTS

| JP | 2006-279535 | 10/2006 |
| JP | 4148721 | 7/2008 |

* cited by examiner

*Primary Examiner* — Gerald Johnson
*Assistant Examiner* — Maheen Javed
(74) *Attorney, Agent, or Firm* — Oblon, McClelland, Maier & Neustadt, L.L.P.

(57) ABSTRACT

An information processing apparatus includes: a control-permission/denial storage unit that stores therein permission/denial information as to whether or not execution of respective control actions in response to a predetermined motions made by users is permitted to roles of the users; a motion detecting unit that detects a predetermined motion from images captured by an image capturing device; and a control-permission/denial determining unit that determines whether or not execution of a control action in response to a predetermined motion made by a user and detected by the motion detecting unit is permitted to a role of the user based on the control-permission/denial storage unit.

10 Claims, 14 Drawing Sheets

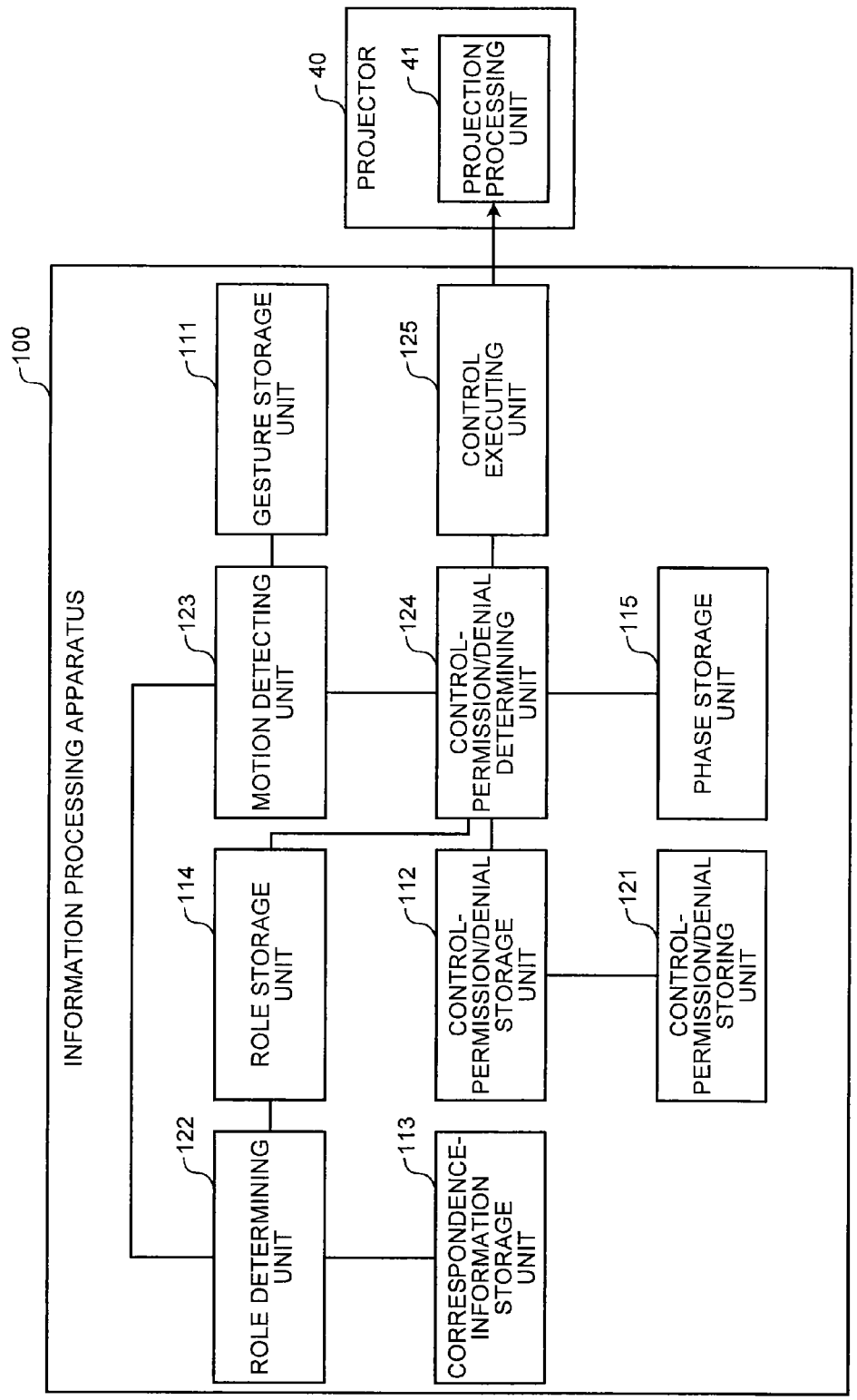

FIG.3

<PHASE: EXPLAINING>

| GESTURE OPERATION \ ROLE | EXPLAINER | REVIEW LEADER | REVIEWER | MINUTE KEEPER |
|---|---|---|---|---|
| GESTURE 1 (GO TO NEXT PAGE OF MATERIAL) | ○ | ○ | × | × |
| GESTURE 2 (GO TO PREVIOUS PAGE OF MATERIAL) | ○ | ▶ | × | × |
| GESTURE 3 (CLOSE MATERIAL) | ○ | ○ | × | × |
| GESTURE 4 (CHANGE MATERIAL) | ○ | × | × | × |
| GESTURE 5 (ACQUIRE MATERIAL) | × | ○ | ○ | ○ |
| GESTURE 6 (UPDATE MINUTE) | × | × | × | ○ |

PHASE
— PREPARING
— EXPLAINING
— QUESTIONING-AND-ANSWERING
— SUMMARIZING

<PHASE: PREPARING>

| GESTURE OPERATION \ ROLE | EX-PLAINER | REVIEW LEADER | RE-VIEWER | MINUTE KEEPER |
|---|---|---|---|---|
| GESTURE 1 (GO TO NEXT PAGE OF MATERIAL) | O | × | × | × |
| GESTURE 2 (GO TO PREVIOUS PAGE OF MATERIAL) | O | × | × | × |
| GESTURE 3 (CLOSE MATERIAL) | O | × | × | × |
| GESTURE 4 (CHANGE MATERIAL) | O | × | × | × |
| GESTURE 5 (ACQUIRE MATERIAL) | O | × | × | × |
| GESTURE 6 (UPDATE MINUTE) | × | × | × | × |

<PHASE: MAKING EXPLAINING>

| GESTURE OPERATION \ ROLE | EX-PLAINER | REVIEW LEADER | RE-VIEWER | MINUTE KEEPER |
|---|---|---|---|---|
| GESTURE 1 (GO TO NEXT PAGE OF MATERIAL) | O | O | × | × |
| GESTURE 2 (GO TO PREVIOUS PAGE OF MATERIAL) | O | O | × | × |
| GESTURE 3 (CLOSE MATERIAL) | O | × | × | × |
| GESTURE 4 (CHANGE MATERIAL) | O | × | × | × |
| GESTURE 5 (ACQUIRE MATERIAL) | O | O | O | O |
| GESTURE 6 (UPDATE MINUTE) | × | × | × | O |

<PHASE: QUESTIONING-AND-ANSWERING>

| GESTURE OPERATION \ ROLE | EX-PLAINER | REVIEW LEADER | RE-VIEWER | MINUTE KEEPER |
|---|---|---|---|---|
| GESTURE 1 (GO TO NEXT PAGE OF MATERIAL) | O | O | O | × |
| GESTURE 2 (GO TO PREVIOUS PAGE OF MATERIAL) | O | O | O | × |
| GESTURE 3 (CLOSE MATERIAL) | O | O | × | × |
| GESTURE 4 (CHANGE MATERIAL) | O | O | × | × |
| GESTURE 5 (ACQUIRE MATERIAL) | O | O | O | O |
| GESTURE 6 (UPDATE MINUTE) | O | × | × | O |

<PHASE: SUMMARIZING>

| GESTURE OPERATION \ ROLE | EX-PLAINER | REVIEW LEADER | RE-VIEWER | MINUTE KEEPER |
|---|---|---|---|---|
| GESTURE 1 (GO TO NEXT PAGE OF MATERIAL) | × | O | × | × |
| GESTURE 2 (GO TO PREVIOUS PAGE OF MATERIAL) | × | O | × | × |
| GESTURE 3 (CLOSE MATERIAL) | × | O | × | × |
| GESTURE 4 (CHANGE MATERIAL) | × | O | × | × |
| GESTURE 5 (ACQUIRE MATERIAL) | × | O | × | × |
| GESTURE 6 (UPDATE MINUTE) | × | O | × | O |

| PHASE | ORDINAL NUMBER | TIME LENGTH (min.) |
|---|---|---|
| PREPARING | 1 | 10 |
| EXPLAINING | 2 | 30 |
| QUESTIONING-AND-ANSWERING | 3 | 15 |
| SUMMARIZING | 4 | 10 |

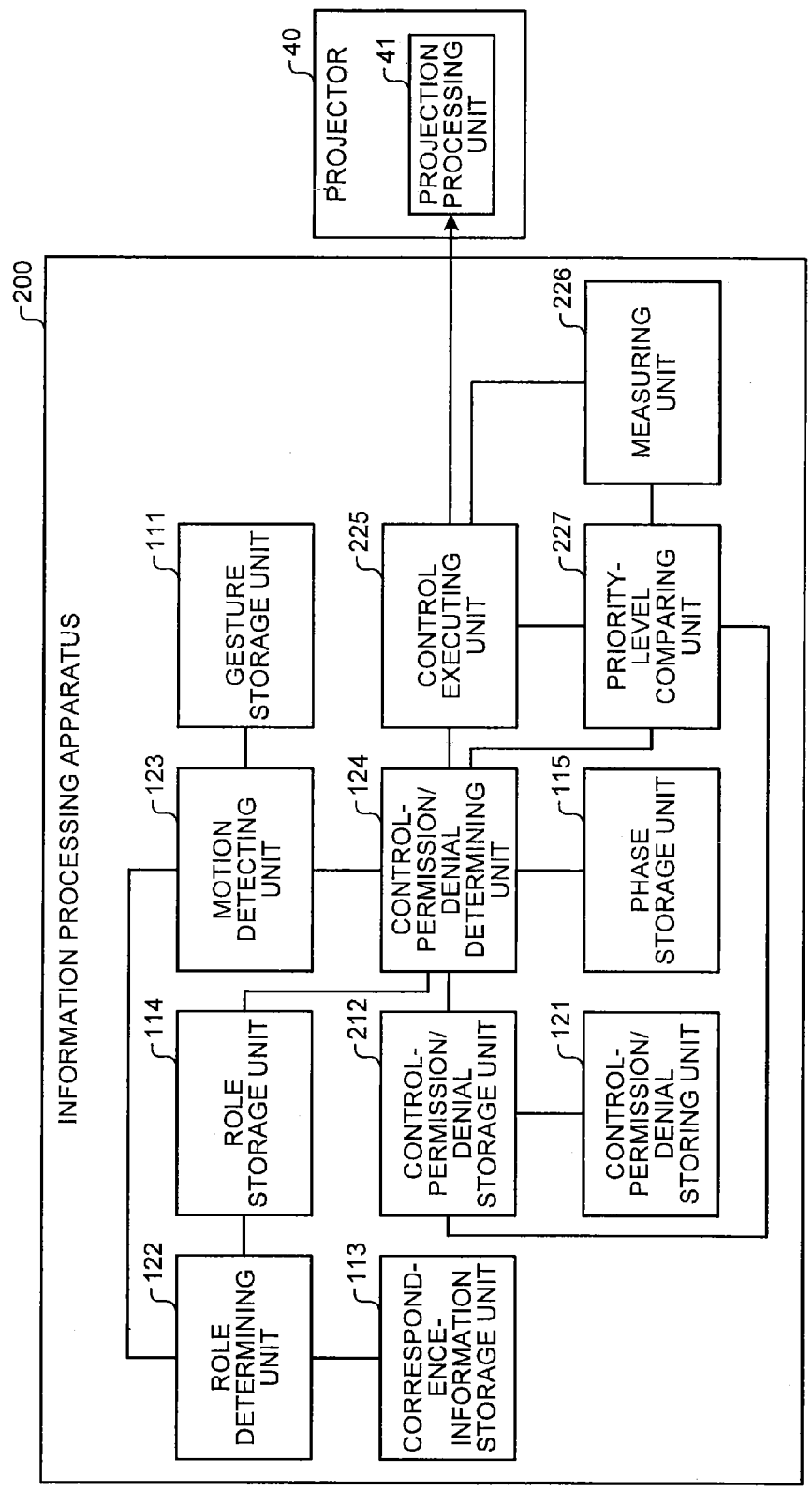

FIG.11

<PHASE: EXPLAINING>

| GESTURE DESCRIPTION \ ROLE | EXPLAINER PRIORITY LEVEL: 1 | REVIEW LEADER PRIORITY LEVEL: 2 | REVIEWER PRIORITY LEVEL: 4 | MINUTE KEEPER PRIORITY LEVEL: 3 |
|---|---|---|---|---|
| GESTURE 1 (GO TO NEXT PAGE OF MATERIAL) | ○ | ○ | × | × |
| GESTURE 2 (GO TO PREVIOUS PAGE OF MATERIAL) | ○ | ○ | × | × |
| GESTURE 3 (CLOSE MATERIAL) | ○ | × | × | × |
| GESTURE 4 (CHANGE MATERIAL) | ○ | × | × | × |
| GESTURE 5 (ACQUIRE MATERIAL) | ○ | ○ | ○ | ○ |
| GESTURE 6 (UPDATE MINUTE) | × | × | × | ○ |

<PHASE: QUESTIONING-AND-ANSWERING>

| GESTURE DESCRIPTION \ ROLE | EXPLAINER PRIORITY LEVEL: 2 | REVIEW LEADER PRIORITY LEVEL: 1 | REVIEWER PRIORITY LEVEL: 4 | MINUTE KEEPER PRIORITY LEVEL: 3 |
|---|---|---|---|---|
| GESTURE 1 (GO TO NEXT PAGE OF MATERIAL) | ○ | ○ | ○ | × |
| GESTURE 2 (GO TO PREVIOUS PAGE OF MATERIAL) | ○ | ○ | ○ | × |
| GESTURE 3 (CLOSE MATERIAL) | ○ | ○ | × | × |
| GESTURE 4 (CHANGE MATERIAL) | ○ | ○ | × | × |
| GESTURE 5 (ACQUIRE MATERIAL) | ○ | ○ | ○ | ○ |
| GESTURE 6 (UPDATE MINUTE) | ○ | × | × | ○ |

<PHASE: EXPLAINING>

| GESTURE OPERATION \ ROLE | AD-VANCER | EX-PLAINER | REVIEW LEADER | RE-VIEWER | MINUTE KEEPER |
|---|---|---|---|---|---|
| GESTURE 1 (GO TO NEXT PAGE OF MATERIAL) | × | ○ | ○ | × | × |
| GESTURE 2 (GO TO PREVIOUS PAGE OF MATERIAL) | × | ○ | ○ | × | × |
| GESTURE 3 (CLOSE MATERIAL) | × | ○ | × | × | × |
| GESTURE 4 (CHANGE MATERIAL) | × | ○ | × | × | × |
| GESTURE 5 (ACQUIRE MATERIAL) | × | ○ | ○ | ○ | ○ |
| GESTURE 6 (UPDATE MINUTE) | × | × | × | × | ○ |
| GESTURE 7 (ADVANCE PHASE) | ○ | × | × | × | × |

INFORMATION PROCESSING APPARATUS, PROJECTION SYSTEM, AND INFORMATION PROCESSING METHOD

CROSS-REFERENCE TO RELATED APPLICATIONS

The present application claims priority to and incorporates by reference the entire contents of Japanese Patent Application No. 2012-112786 filed in Japan on May 16, 2012.

BACKGROUND OF THE INVENTION

1. Field of the Invention

The present invention generally relates to an information processing apparatus, a projection system, and an information processing method.

2. Description of the Related Art

Various techniques have conventionally been utilized in conferences participated by a plurality of users to enhance conference efficiency. For example, Japanese Patent Application Laid-open No. 2006-279535 and Japanese Patent No. 4148721 disclose techniques, in which each of users participating in a conference operates user's own terminal connected to a network, thereby proceeding with the conference. In a technique disclosed in Japanese Patent Application Laid-open No. 2006-279535, an operation authority, which is an authority to operate a user terminal, is switched among users according to progress of a conference.

There is a technique to cause a projector to be operated without using a user terminal but in response to a predetermined motion (gesture) made by a user. In a technique to implement such an operation in response to a gesture, for instance, an operation authority is granted to a user that made a gesture to gain the operation authority. When the user granted with the operation authority makes a gesture, an operation in response to the gesture is implemented.

However, the conventional technique to implement an operation in response to a gesture is disadvantageous in not being capable of granting an operation authority appropriately. Specifically, the conventional technique to implement an operation in response to a gesture undesirably grants an operation authority to a user that makes a gesture to gain an operation authority even if the user does not intend to gain an operation authority. Thus, the conventional technique to implement an operation in response to a gesture is not capable of granting an operation authority appropriately.

In view of the disadvantage, there exists a need to provide an information processing apparatus, a projection system, and a computer program product capable of granting an operation authority appropriately in a technique to implement an operation in response to a gesture made by a user.

SUMMARY OF THE INVENTION

It is an object of the present invention to at least partially solve the problems in the conventional technology.

An information processing apparatus includes: a control-permission/denial storage unit that stores therein permission/denial information as to whether or not execution of respective control actions in response to a predetermined motions made by users is permitted to roles of the users; a motion detecting unit that detects a predetermined motion from images captured by an image capturing device; and a control-permission/denial determining unit that determines whether or not execution of a control action in response to a predetermined motion made by a user and detected by the motion detecting unit is permitted to a role of the user based on the control-permission/denial storage unit.

A projection system includes an information processing apparatus and a projection apparatus. The projection system includes: a control-permission/denial storage unit that stores therein permission/denial information as to whether or not execution of respective control actions in response to predetermined motions made by users is permitted to roles of the users; a motion detecting unit that detects a predetermined motion from images captured by an image capturing device; a control-permission/denial determining unit that determines whether or not execution of a control action in response to a predetermined motion made by a user and detected by the motion detecting unit is permitted to a role of the user based on the control-permission/denial storage unit; a control executing unit that, when the control-permission/denial determining unit determines that execution of the control action is permitted, executes the control action in response to the predetermined motion made by the user; and a projection processing unit that performs a projecting operation according to the control action executed by the control executing unit.

An information processing method includes: detecting a predetermined motion from images captured by an image capturing device; and determining whether or not execution of the control action in response to the detected predetermined motion made by a user is permitted to a role of the user based on a control-permission/denial storage unit that stores therein permission/denial information as to whether or not execution of respective control actions in response to predetermined motions made by users is permitted to roles of the users.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a functional block diagram illustrating an example configuration of an information processing apparatus according to a first embodiment;

FIG. 3 is a diagram illustrating an example of a control-permission/denial entering screen;

FIG. 4 is a diagram illustrating an example of information stored in a control-permission/denial storage unit according to the first embodiment;

FIG. 10 is a functional block diagram illustrating an example configuration of an information processing apparatus according to a second embodiment;

FIG. 11 is a diagram illustrating an example of information stored in a control-permission/denial storage unit according to the second embodiment;

DETAILED DESCRIPTION OF THE PREFERRED EMBODIMENTS

Embodiments of an information processing apparatus, a projection system, and an information processing method according to the present invention are described below with reference to the accompanying drawings. Note that the embodiments are not intended to limit the scope of the present invention. The embodiments may be combined as appropriate so long as no contradiction arises.

First Embodiment

Figure 1:
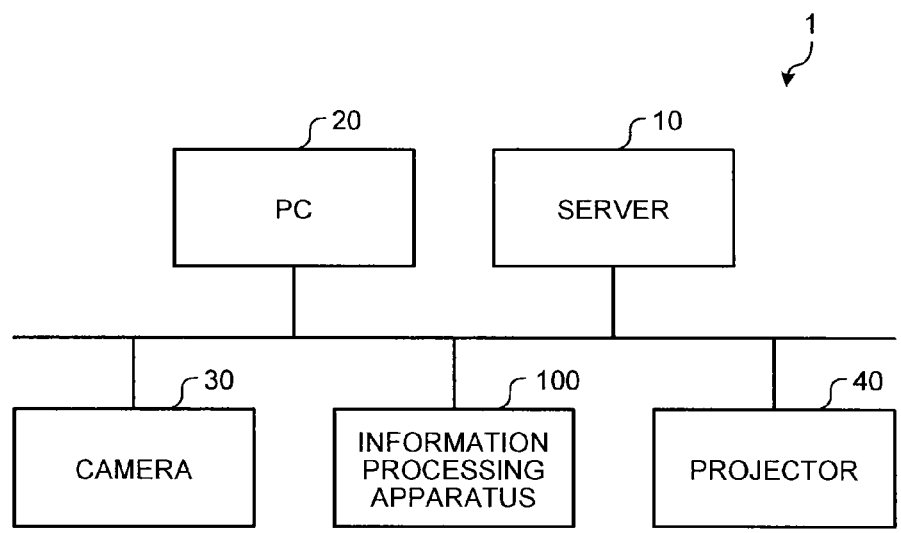
FIG. 1 is a diagram illustrating an example configuration of a projection system.

A configuration of a projection system is described below with reference to FIG. 1. FIG. 1 is a diagram illustrating an example configuration of the projection system. As illustrated in FIG. 1, a projection system 1 includes a server 10, a personal computer (PC) 20, a camera 30, a projector 40, and an information processing apparatus 100 connected to a network.

The server 10 holds therein a material, an image of which is to be projected by the projector 40. The PC 20 includes an input device such as a mouse and/or a keyboard. The PC 20 is used to set permission/denial information, which will be described later. The camera 30 captures images of users participating in a conference. The camera 30 is utilized to locate users and to recognize a gesture made by a user. The projector 40 projects an image of the material utilized in the conference on a projection plane such as a screen. The projector 40 is an example of a device to be operated by a gesture made by a user.

The information processing apparatus 100 stores therein permission/denial information as to whether or not execution of respective control actions in response to gestures made by users is permitted to roles of the users. The information processing apparatus 100 detects a gesture made by a user from the images captured by the camera 30. The information processing apparatus 100 determines whether or not execution of a control action in response to the gesture made by the user is permitted to a role of the user. Thereafter, when it is determined that execution of the control action is permitted, the information processing apparatus 100 executes the control action in response to the user's gesture. Examples of control actions in response to user's gestures include an operation of the projector 40. The projector 40 performs a projecting operation of projecting an image on the screen according to control by the information processing apparatus 100.

The configuration of the information processing apparatus 100 according to the first embodiment is described below with reference to FIG. 2. FIG. 2 is a functional block diagram illustrating an example configuration of the information processing apparatus 100 according to the first embodiment.

As illustrated in FIG. 2, the information processing apparatus 100 includes a gesture storage unit 111, a control-permission/denial storage unit 112, a correspondence-information storage unit 113, a role storage unit 114, and a phase storage unit 115. The information processing apparatus 100 further includes a control-permission/denial storing unit 121, a role determining unit 122, a motion detecting unit 123, a control-permission/denial determining unit 124, and a control executing unit 125.

The gesture storage unit 111 stores therein information on control actions associated with gestures. More specifically, the gesture storage unit 111 stores therein information on control actions to be executed on the projector 40, such as going to another page of an explanatory material, closing an explanatory material, and changing to another explanatory material, such that each of the control actions is associated with a specific gesture. The gesture storage unit 111 also stores therein information on control actions, such as acquiring an explanatory material and updating a minute, such that each of the control actions is associated with a specific gesture.

The control actions in response to gestures are described below. "Go to next page of material" denotes a control action of causing the projector 40 that is projecting an image of a current page of a material, to display an image of the next page of the material. "Go to previous page of material" denotes a control action of causing the projector 40 that is projecting an image of a current page of a material, to display an image of the previous page of the material. "Close material" denotes a control action of causing the projector 40 that is projecting an image, to stop image projection.

"Change material" denotes a control action of, in a situation where there are a plurality of materials containing images to be projected by the projector 40, causing the projector 40 to project predetermined pages (e.g., first pages) of the materials in order to allow a user to select a material for use in a conference from the plurality of materials and change the projected material. "Acquire material" denotes a control action of acquiring a material from the server 10 or a predetermined storage device that holds the material. "Update minute" denotes a control action of creating or updating data containing progress and/or contents of a conference using an arbitrary method.

The control-permission/denial storing unit 121 stores permission/denial information as to whether or not execution of respective control actions in response to gestures made by users is permitted to roles of the users on a per-conference-phase basis. The permission/denial information is fed (transmitted) from the PC 20. The control-permission/denial storing unit 121 receives the permission/denial information and stores it in the control-permission/denial storage unit 112. The permission/denial information is set using the PC 20 at desired timing, e.g., before start of or during a conference. The PC 20 displays a control-permission/denial entering screen to set the permission/denial information. The conference phases are an example of stages of progress of a job for which the information processing apparatus 100 is utilized.

FIG. 3 is a diagram illustrating an example of the control-permission/denial entering screen. As illustrated in FIG. 3, the control-permission/denial entering screen is configured in such a manner that whether or not to permit execution of a control action in response to a gesture made by a user to a role of the user is selectable on the per-conference-phase basis. A user selects one of phase items displayed on a left portion of the control-permission/denial entering screen using the input device of the PC 20, and selects "o" in a select box to permit execution of a control action to a role, whereas the user selects "x" in the select box to deny execution of a control action to a role, for each of the control actions in response to the respective gestures and for each of the roles. FIG. 3 illustrates an example where "o" or "x" is selected to or not to permit execution of a control action in response to a gesture "gesture 2 (go to previous page of material)" made by a role "review leader" in a phase "explaining". When all settings are completed and thereafter a predetermined operation is performed, the PC 20 transmits the set permission/denial information to the information processing apparatus 100.

The control-permission/denial storage unit 112 stores therein permission/denial information as to whether or not execution of respective control actions in response to gestures made by users is permitted to roles of the users on the per-conference-phase basis. FIG. 4 is a diagram illustrating an example of the information stored in the control-permission/denial storage unit 112 according to the first embodiment. As illustrated in FIG. 4, the control-permission/denial storage unit 112 stores therein permission/denial information "o (permitted)" or "x (denied)" as to whether or not to permit execution of each of control actions in response to one of gestures "gesture 1 (go to next page of material)", "gesture 2 (go to previous page of material)", "gesture 3 (close material)", "gesture 4 (change material)", "gesture 5 (acquire material)", and "gesture 6 (update minute)", for each of users' roles "explainer", "review leader", "reviewer", and "minute keeper", and for each of conference phases "preparing", "explaining", "questioning-and-answering", and "summarizing".

For example, the control-permission/denial storage unit 112 stores therein permission/denial information, according to which, in the phase "explaining", execution of the control action in response to the gesture "gesture 1 (go to next page of material)" made by the role "explainer" is "o (permitted)"; execution of the control action in response to the gesture "gesture 1 (go to next page of material)" made by the role "review leader" is "o (permitted)"; execution of the control action in response to the gesture "gesture 1 (go to next page of material)" made by the role "reviewer" is "x (denied)"; execution of the control action in response to the gesture "gesture 1 (go to next page of material)" made by the role "minute keeper" is "x (denied)".

Figure 5:
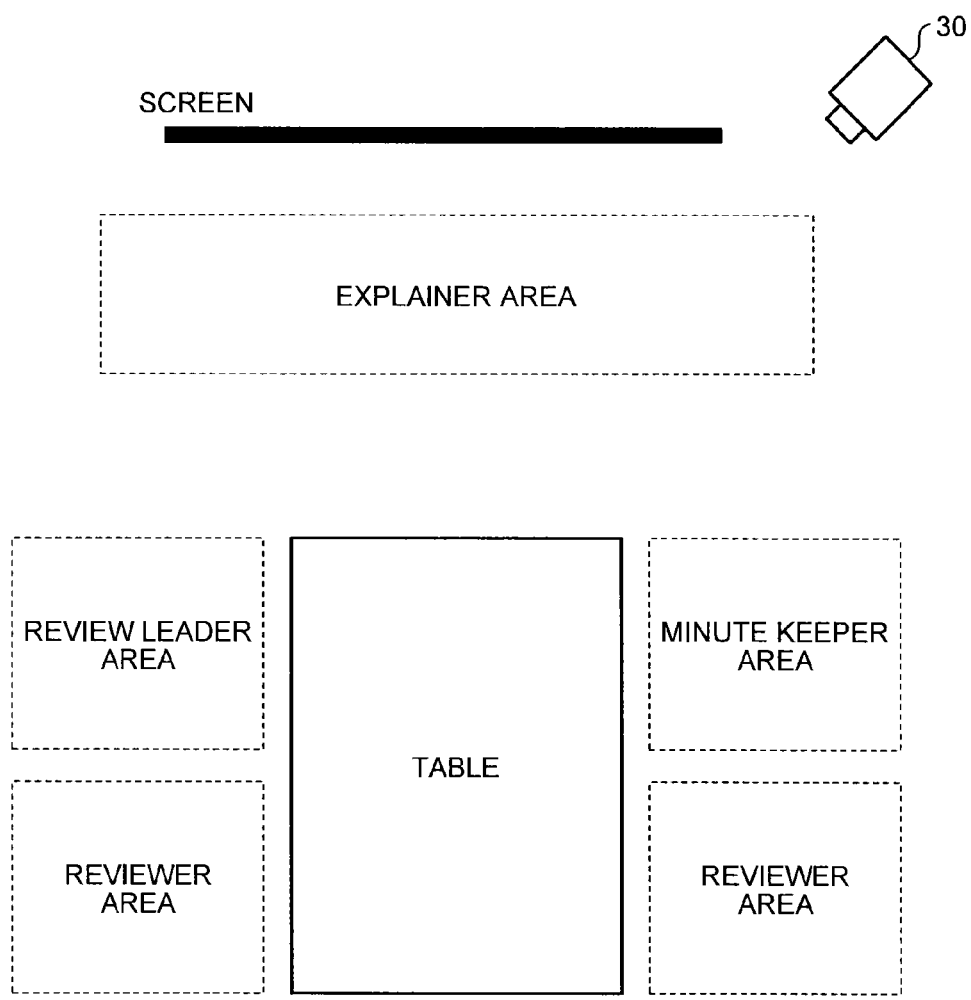
FIG. 5 is an explanatory diagram of an example of users' roles assigned to respective areas.

The correspondence-information storage unit 113 stores therein area locations of predetermined regions in a conference room where a conference is held, and users' roles, which are assigned to the area locations, in the conference, in a manner associated with each other. FIG. 5 is an explanatory diagram of an example of users' roles assigned to respective areas. As illustrated in FIG. 5, a "explainer area" is positioned near a screen; a "review leader area", "reviewer areas", and a "minute keeper area" are positioned near a table on which the information processing apparatus 100, the projector 40, and the like are assigned. Thus, the correspondence-information storage unit 113 stores therein information about locations of the "explainer area", the "review leader area", the "reviewer areas", and the "minute keeper area", and roles corresponding to the respective locations, which are the "explainer", the "review leader", the "reviewer", and the "minute keeper", in a manner associated with one another.

The camera 30 illustrated in FIG. 5 captures an image of users participating in a conference. As described above, in one aspect, the camera 30 is utilized to locate the users. The camera 30 transmits the captured image to the motion detecting unit 123 of the information processing apparatus 100. The motion detecting unit 123 receives the image captured by the camera 30 and detects locations of the users from the received image. Any applicable technique can be utilized to detect the locations. The motion detecting unit 123 outputs the detected locations of the users to the role determining unit 122.

The role determining unit 122 determines roles of the users by obtaining roles assigned to the respective areas including the locations of the users detected by the motion detecting unit 123, from the correspondence-information storage unit 113, and stores the determined roles of the users together with the location information in the role storage unit 114. The role determining unit 122 determines the roles of the users as appropriate. The role storage unit 114 stores therein the roles of the users participating in the conference. More specifically, the role storage unit 114 stores therein the roles of the users determined by the role determining unit 122 together with the location information.

The motion detecting unit 123 also detects a gesture made by a user from images captured by the camera 30. More specifically, the motion detecting unit 123 determines whether or not a gesture, which is recognized based on the change in a motion feature pertaining to a user calculated every predetermined frames, is stored in the gesture storage unit 111, thereby making detection of the gesture made by the user. The motion detecting unit 123 also obtains a control action associated with the detected gesture from the gesture storage unit 111. An employable method of recognizing a gesture is not limited to the method described above, but any appropriate method can be utilized. At this time, the motion detecting unit 123 also detects a location of the user that made the detected gesture. The motion detecting unit 123 outputs the detected gesture (the control action associated with the gesture) and the location of the user that made the gesture to the control-permission/denial determining unit 124.

The control-permission/denial determining unit 124 identifies a role of the user that made the gesture and determines whether or not execution of the control action in response to the gesture made by the user is permitted to the identified role of the user. More specifically, the control-permission/denial determining unit 124 obtains a role associated with the location, which is detected by the motion detecting unit 123, of the user that made the gesture, from the role storage unit 114, thereby identifying the role of the user. The control-permission/denial determining unit 124 also identifies a current phase by accessing the phase storage unit 115.

Figures 6, 7:
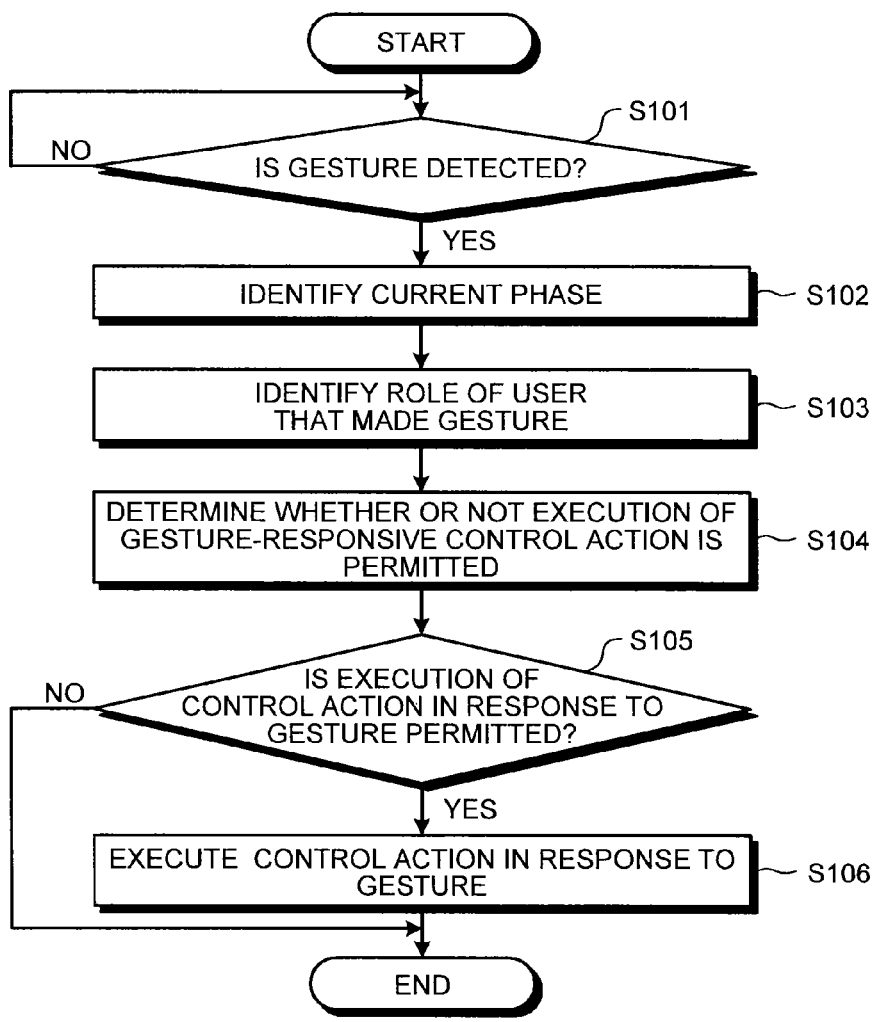
FIG. 6 is a diagram illustrating an example of information stored in a phase storage unit according to the first embodiment.
FIG. 7 is a flowchart illustrating an example of a flow of overall operations according to the first embodiment.

The phase storage unit 115 stores therein information to identify a current phase. FIG. 6 is a diagram illustrating an example of the information stored in the phase storage unit 115 according to the first embodiment. As illustrated in FIG. 6, the phase storage unit 115 stores "phase" denoting a phase in a conference, "ordinal number" denoting an ordinal number of the phase, and "time length" denoting a length of time of the phase in a manner associated with one another. For example, the phase storage unit 115 stores therein the phase "preparing", an ordinal number "1", and a length of time "10" in a manner associated with one another. FIG. 6 illustrates an example in which the conference is proceeded in an order of preparing, explaining, questioning-and-answering, and summarizing; and phase change occurs in the conference with duration of 65 minutes in such a manner that preparing takes 10 minutes, making explanation takes 30 minutes, questioning-and-answering takes 15 minutes, and summarizing takes 10 minutes.

The control-permission/denial determining unit 124 identifies the current phase based on time elapsed since start time of the conference by accessing the phase storage unit 115. The control-permission/denial determining unit 124 determines whether or not execution of the control action in response to the gesture detected by the motion detecting unit 123 is permitted to the identified role of the user in the current phase by accessing the control-permission/denial storage unit 112.

For example, when a user with the role "explainer" makes the gesture "gesture 1 (go to next page of material)" in the phase "explaining", the control-permission/denial determining unit 124 obtains the permission/denial information "o (permitted)" from the control-permission/denial storage unit 112, thereby determining that execution of the control action in response to the gesture "gesture 1 (go to next page of material)" made by the user is "permitted". For another example, when a user with the role "reviewer" makes the gesture "gesture 2 (go to previous page of material)" in the phase "explaining", the control-permission/denial determining unit 124 obtains the permission/denial information "x (denied)" from the control-permission/denial storage unit 112, thereby determining that execution of the control action in response to the gesture "gesture 2 (go to previous page of material)" made by the user is "denied".

Thereafter, when the result of determination is "permitted", the control-permission/denial determining unit 124 outputs the control action in response to the gesture to the control executing unit 125; put another way, the determination "permitted" means that the user that made the gesture has the operation authority. On the other hand, when the result of determination is "denied", the control action in response to the gesture is not executed; put another way, the determination "denied" means that the user that made the gesture does not have the operation authority. As described above, examples of control actions in response to gestures include control actions to be executed on the projector 40, such as going to another page of an explanatory material, closing an explanatory material, and changing to another explanatory material, a control action to be executed on the server 10 or the predetermined storage device, such as acquiring an explanatory material, and a control action related to data creation or update, such as updating a minute.

When the result of determination made by the control-permission/denial determining unit 124 is "permitted", the control executing unit 125 executes the control action in response to the gesture. More specifically, the control executing unit 125 executes the control action such as "go to next page of material", "go to previous page of material", "close material", or "change material" on the projector 40, the control action such as "acquire material" on the server 10 or the predetermined storage device, or the control action related to data creation or update such as "update minute". The control actions are described in detail below; when the control action to be executed on the projector 40 is "go to next page of material", "go to previous page of material", or "change material", a corresponding image of a material is transmitted to the projector 40. When the control action to be executed on the projector 40 is "close material", a signal to stop projecting a currently-projected image is transmitted to the projector 40.

A projection processing unit 41 of the projector 40 performs a projecting operation according to the control action executed by the control executing unit 125. More specifically, the projection processing unit 41 performs a projecting operation of projecting an image transmitted from the control executing unit 125 of the information processing apparatus 100, stops the projecting operation in response to the signal to stop projecting transmitted from the control executing unit 125, and the like.

A flow of overall operations according to the first embodiment is described below with reference to FIG. 7. FIG. 7 is a flowchart illustrating an example of the flow of the overall operations according to the first embodiment. The flow is described with reference to FIG. 7 on an assumption that roles of users are already determined.

As illustrated in FIG. 7, the motion detecting unit 123 determines whether or not a gesture made by a user is detected from images captured by the camera 30 (Step S101). When the motion detecting unit 123 detects a user's gesture (Yes at Step S101), the control-permission/denial determining unit 124 identifies a current phase by accessing the phase storage unit 115 (Step S102). On the other hand, when the motion detecting unit 123 does not detect a user's gesture (No at Step S101), the motion detecting unit 123 goes in a gesture-detection wait state.

The control-permission/denial determining unit 124 then obtains a role of the user that made the gesture detected by the motion detecting unit 123 from the role storage unit 114, thereby identifying the role of the user (Step S103). Subsequently, the control-permission/denial determining unit 124 determines whether or not execution of a control action in response to the gesture made by the user is permitted to the identified role in the current phase by accessing the control-permission/denial storage unit 112 (Step S104).

When the control-permission/denial determining unit 124 determines that execution of the control action in response to the gesture is permitted (Yes at Step S105), the control executing unit 125 executes the control action in response to the gesture (Step S106). The projector 40 performs a projecting operation of projecting a predetermined image on the screen according to the control action executed by the control executing unit 125. On the other hand, when the control-permission/denial determining unit 124 determines that execution of the control action in response to the gesture is denied (No at Step S105), processing is terminated without executing the control action in response to the gesture.

Figure 8:
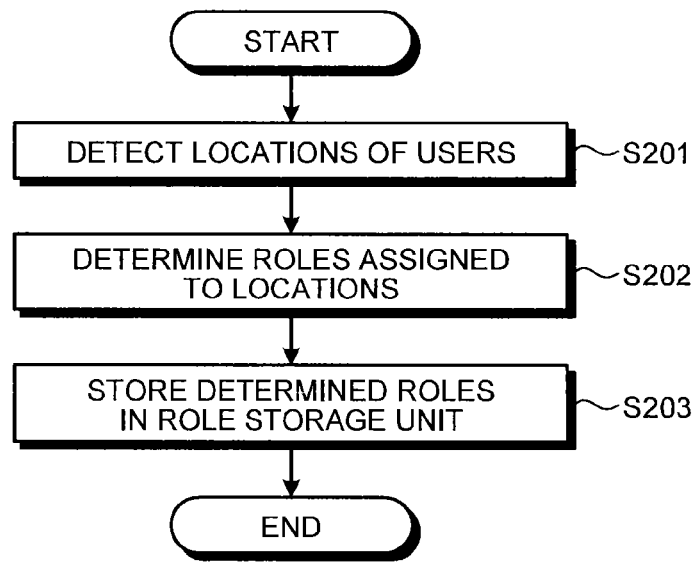
FIG. 8 is a flowchart illustrating an example of a flow of a role determining operation according to the first embodiment.

A flow of a role determining operation according to the first embodiment is described below with reference to FIG. 8. FIG. 8 is a flowchart illustrating an example of the flow of the role determining operation according to the first embodiment.

As illustrated in FIG. 8, the motion detecting unit 123 receives an image captured by the camera 30 and detects locations of users from the received image (Step S201). The role determining unit 122 determines roles of the users by obtaining roles associated with respective areas including the locations of the users detected by the motion detecting unit 123 from the correspondence-information storage unit 113 (Step S202). The role determining unit 122 stores the determined roles of the users in the role storage unit 114 together with the location information (Step S203).

Figure 9:
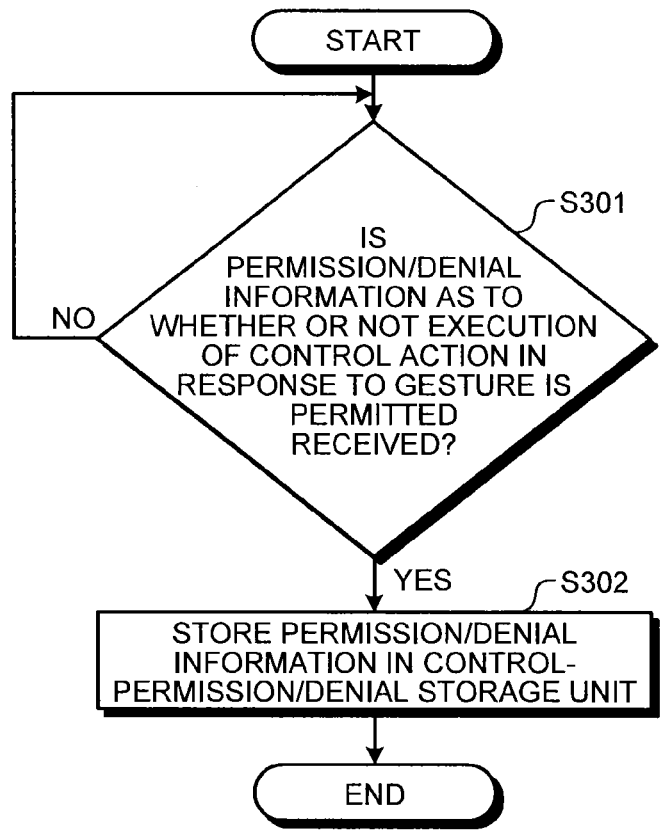
FIG. 9 is a flowchart illustrating an example of a flow of a control-permission/denial entering operation.

A flow of a control-permission/denial entering operation is described below with reference to FIG. 9. FIG. 9 is a flowchart illustrating an example of the flow of the control-permission/denial entering operation.

As illustrated in FIG. 9, when the control-permission/denial storing unit 121 receives permission/denial information, which is transmitted from the PC 20 connected to the network, as to whether or not execution of respective control actions in response to gestures is permitted (Yes at Step S301), the control-permission/denial storing unit 121 stores the received permission/denial information in the control-permission/denial storage unit 112 (Step S302). When receiving no permission/denial information (No at Step S301), the control-permission/denial storing unit 121 goes into a gesture-detection wait state.

As described above, the information processing apparatus 100 stores roles of users participating in a conference and permission/denial information as to whether or not execution of each of control actions in response to gestures is permitted on the per-conference-phase basis, determines whether or not execution of a control action in response to a user's gesture is permitted using the permission/denial information, and executes the control action when execution of the control action is permitted. Accordingly, the information processing apparatus 100 can grant an operation authority appropriately. Put another way, the information processing apparatus 100 determines whether or not execution of a control action in response to a detected gesture made by a user is permitted by utilizing the permission/denial information as to whether or not execution of the respective control actions in response to the gestures is permitted, which is defined on a per-conference-phase basis, to roles of the users. Accordingly, the information processing apparatus 100 is capable of granting an operation authority more appropriately than the conventional technique, by which an unintended operation can be performed as a result of that an operation authority is undesirably granted to a user having no intention to gain an operation authority.

Second Embodiment

In the first embodiment, a control action in response to a gesture is executed when execution of the control action is determined as being permitted based on permission/denial information, which is set on the per-conference-phase basis, as to whether or not execution of the respective control actions in response to the gestures is permitted to respective users' roles. In a second embodiment, priority levels are assigned to users' roles in advance. In a situation where a gesture is made within a predetermined period of time after a preceding control action is executed, a control action is executed when a priority level assigned to a role of a user that made the gesture is higher than a priority level assigned to a role of a user involved in the preceding control action.

The configuration of an information processing apparatus according to the second embodiment is described below with reference to FIG. 10. FIG. 10 is a functional block diagram illustrating an example configuration of the information processing apparatus according to the second embodiment. In FIG. 10, elements similar to those of the first embodiment are denoted by like reference numerals and detailed description about such elements is omitted as appropriate. The second embodiment is similar to the first embodiment in function, configuration, and operation of the units other than a control-permission/denial storage unit 212, a control executing unit 225, a measuring unit 226, and a priority-level comparing unit 227, which are described below.

As illustrated in FIG. 10, an information processing apparatus 200 includes the gesture storage unit 111, the control-permission/denial storage unit 212, the correspondence-information storage unit 113, the role storage unit 114, and the phase storage unit 115. The information processing apparatus 200 further includes the control-permission/denial storing unit 121, the role determining unit 122, the motion detecting unit 123, the control-permission/denial determining unit 124, the control executing unit 225, the measuring unit 226, and the priority-level comparing unit 227.

The control-permission/denial storage unit 212 stores therein permission/denial information as to whether or not execution of respective control actions in response to gestures made by users is permitted to roles of the users and a priority levels in terms of execution of the control actions and assigned to the roles. FIG. 11 is a diagram illustrating an example of the information stored in the control-permission/denial storage unit 212 according to the second embodiment. Note that whereas FIG. 11 illustrates only permission/denial information for the conference phases "explaining" and "questioning-and-answering", in practice, permission/denial information for the conference phases "preparing" and "summarizing" is also stored in the control-permission/denial storage unit 212.

As illustrated in FIG. 11, the control-permission/denial storage unit 212 stores therein permission/denial information "o (permitted)" or "x (denied)" as to whether or not to permit execution of each of the control actions in response to one of the gestures "gesture 1 (go to next page of material)", "gesture 2 (go to previous page of material)", "gesture 3 (close material)", "gesture 4 (change material)", "gesture 5 (acquire material)", and "gesture 6 (update minute)" to respective users' roles "explainer", "review leader", "reviewer", and "minute keeper" for each of the conference phases "explaining" and "questioning-and-answering". The control-permission/denial storage unit 212 also stores therein control-action priority levels "priority level: 1", "priority level: 2", "priority level: 4", and "priority level: 3" assigned to the users' roles "explainer", "review leader", "reviewer", and "minute keeper", respectively.

The priority levels are utilized to determine whether or not to execute a control action determined as being permitted in a situation where, within a predetermined period of time after a preceding control action in response to a gesture made by a user of a certain role is executed, the control action in response to a gesture made by another user of a role deferent from the certain role is determined as being permitted. More specifically, in the above situation, the control action determined as being permitted is executed when a priority level assigned to the role of the user, to which the execution is determined as being permitted, is higher than a priority level assigned to the certain role. The priority levels can be assigned in such a manner that, for example, "1" is the highest and "4" is the lowest.

The measuring unit 226 measures time elapsed since a control action is executed by the control executing unit 225. The control executing unit 225 stores a role of a user that executed the control action in a predetermined memory. When execution of a control action is determined as being permitted by the control-permission/denial determining unit 124 before the elapsed time measured by the measuring unit 226 reaches a predetermined value, the priority-level comparing unit 227 obtains a priority level assigned to a role of a user, to which the execution is determined as being permitted, from the control-permission/denial storage unit 212. The priority-level comparing unit 227 obtains the role of the user that made a gesture, in response to which the preceding control action is executed, from the predetermined memory, and obtains a priority level assigned to the obtained role from the control-permission/denial storage unit 212. The priority-level comparing unit 227 compares the priority level assigned to the role of the user, to which the execution is determined as being permitted, to the priority level assigned to the role of the user that made the gesture, in response to which the preceding control action is executed. The predetermined value is 5 seconds, for example.

When a result of the comparison by the priority-level comparing unit 227 is that the priority level assigned to the role of the user, to which the execution is determined as being permitted, is higher, the control executing unit 225 executes the control action in response to the gesture made by the user to which the execution is determined as being permitted. On the other hand, when the result of the comparison by the priority-level comparing unit 227 is that the priority level assigned to the role of the user, to which the execution is determined as being permitted, is lower, the control executing unit 225 terminates processing without executing the control action in response to the gesture made by the user to which the execution is determined as being permitted. When the elapsed time is equal to or greater than the predetermined value, operations as in the first embodiment are performed.

The operations performed by the units described above are described below by way of examples. Described first is an example where the priority level assigned to the role of the user, to which execution of the control action is determined as being permitted, is higher than the priority level assigned to the role of the user that made the gesture, in response to which the preceding control action is executed.

For instance, the control executing unit 225 executes the control action in response to the gesture "gesture 1 (go to next page of material)" made by a user of the role "review leader" in the phase "explaining". The control executing unit 225 stores the role "review leader" of the user that executed the control action in the predetermined memory. At this time, the measuring unit 226 starts measuring time elapsed since the control executing unit 225 executes the control action. Thereafter, before the elapsed time measured by the measuring unit 226 reaches "5 seconds", the control-permission/denial determining unit 124 determines that execution of the control action in response to the gesture "gesture 2 (go to previous page of material)" made by a user of the role "explainer" is permitted. Note that, even in a situation where the control-permission/denial determining unit 124 determines that execution of the control action is permitted, unless the elapsed time measured by the measuring unit 226 reaches "5 seconds", the control executing unit 225 does not execute the control action determined as being permitted until the control executing unit 225 receives a result of comparison by the priority-level comparing unit 227.

When the determination is made by the control-permission/denial determining unit 124 as described above, the priority-level comparing unit 227 performs: obtaining the priority level "1" assigned to the role "explainer" of the user, to which the execution is determined as being permitted by the control-permission/denial determining unit 124, from the control-permission/denial storage unit 212; obtaining the role "review leader" of the user that made the gesture, in response to which the preceding control action is executed by the control executing unit 225, from the predetermined memory; and obtaining the priority level "2" assigned to the obtained role "review leader" from the control-permission/denial storage unit 212. The priority-level comparing unit 227 then compares the priority level "1" assigned to the role "explainer" to the priority level "2" assigned to the role "review leader" obtained from the control-permission/denial storage unit 212. The priority-level comparing unit 227 outputs to the control executing unit 225 a result of comparison that the priority level "1" assigned to the role "explainer" of the user, to which the execution is determined as being permitted, is higher.

Upon receiving the result of comparison by the priority-level comparing unit 227, the control executing unit 225 executes the current control action in response to the gesture "gesture 2 (go to previous page of material)" made by the user of the role "explainer" to which execution of the control action is determined as being permitted by the control-permission/denial determining unit 124. The control action is executed on the projector 40.

Described next is an example where the priority level assigned to the role of the user that made the gesture, in response to which the preceding control action is executed, is higher than the priority level assigned to the role of the user, to which execution of the control action is determined as being permitted.

For instance, the control executing unit 225 executes the control action in response to the gesture "gesture 1 (go to next page of material)" made by the role "review leader" in the phase "questioning-and-answering". The control executing unit 225 stores the role "review leader" of a user that executed the control action in the predetermined memory. At this time, the measuring unit 226 starts measuring time elapsed since the control executing unit 225 executes the control action. Thereafter, while the elapsed time measured by the measuring unit 226 is smaller than "5 seconds", the control-permission/denial determining unit 124 determines that execution of the control action in response to the gesture "gesture 2 (go to previous page of material)" made by a user of the role "explainer" is permitted. Note that, even in a situation where the control-permission/denial determining unit 124 determines that execution of the control action is permitted, unless the elapsed time measured by the measuring unit 226 reaches "5 seconds", the control executing unit 225 does not execute the control action determined as being permitted until the control executing unit 225 receives a result of comparison by the priority-level comparing unit 227.

When the determination is made as described above by the control-permission/denial determining unit 124, the priority-level comparing unit 227 performs: obtaining the priority level "2" assigned to the role "explainer" of the user, to which the execution is determined as being permitted by the control-permission/denial determining unit 124, from the control-permission/denial storage unit 212; obtaining the role "review leader" of the user that made the gesture, in response to which the preceding control action is executed by the control executing unit 225, from the predetermined memory; and obtaining the priority level "1" assigned to the obtained role "review leader" from the control-permission/denial storage unit 212. The priority-level comparing unit 227 then compares the priority level "2" assigned to the role "explainer" to the priority level "1" assigned to the role "review leader" obtained from the control-permission/denial storage unit 212. The priority-level comparing unit 227 outputs to the control executing unit 225 a result of comparison that the priority level "1" assigned to the role "review leader" of the user that made the gesture, in response to which the preceding control action is executed, is higher.

Upon receiving the result of comparison by the priority-level comparing unit 227, the control executing unit 225 terminates processing without executing the control action in response to the gesture "gesture 2 (go to previous page of material)" made by the user of the role "explainer" to which execution of the control action is determined as being permitted by the control-permission/denial determining unit 124.

Figure 12:
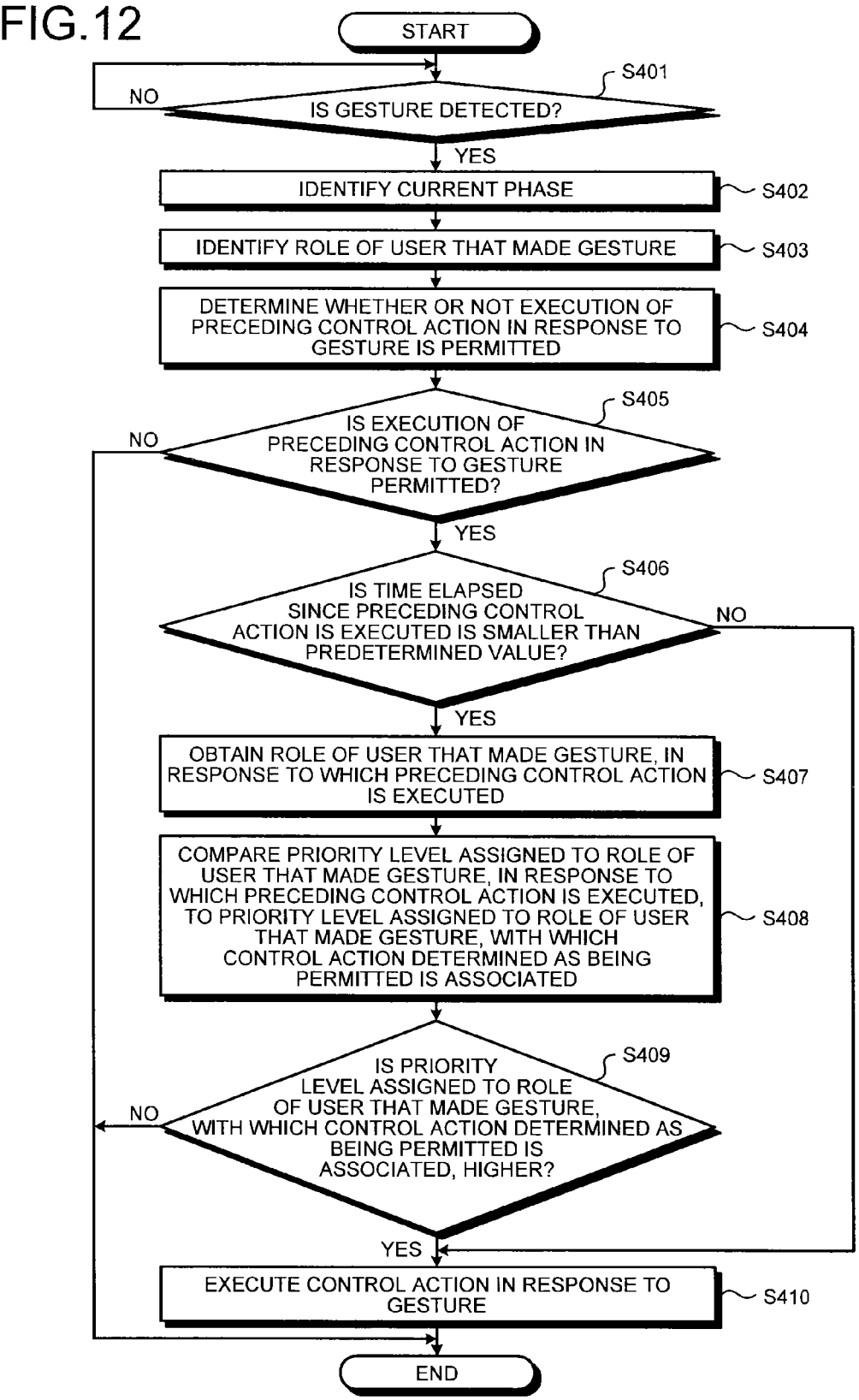
FIG. 12 is a flowchart illustrating an example of a flow of overall operations according to the second embodiment.

A flow of overall operations according to the second embodiment is described below with reference to FIG. 12. FIG. 12 is a flowchart illustrating an example of the flow of the overall operations according to the second embodiment. The flow is described with reference to FIG. 12 on an assumption that the measuring unit 226 measures time elapsed since a preceding control action is executed. Note that operations similar to a part of the overall operations according to the first embodiment are omitted as appropriate. Specifically, operations to be performed at Steps S401 to S404 are similar to the operations performed at Steps S101 to S104.

As illustrated in FIG. 12, when the control-permission/denial determining unit 124 determines that execution of a control action in response to a gesture is permitted (Yes at Step S405), the priority-level comparing unit 227 determines whether or not time elapsed measured by the measuring unit 226 since a preceding control action is executed is smaller than a predetermined value (Step S406). At this time, when the priority-level comparing unit 227 determines that the elapsed time is smaller than the predetermined value (Yes at Step S406), the priority-level comparing unit 227 obtains a role of a user that made a gesture, in response to which the preceding control action is executed, from the predetermined memory (Step S407).

The priority-level comparing unit 227 obtains a priority level assigned to the role of the user that made the gesture, in response to which the preceding control action is executed, and a priority level assigned to a role of a user that made the gesture, with which the control action determined as being permitted by the control-permission/denial determining unit 124 is associated, from the control-permission/denial storage unit 212 and performs comparison between the obtained priority levels (Step S408). When a result of the comparison by the priority-level comparing unit 227 is that the priority level assigned to the role of the user, to which the execution is determined as being permitted, is higher (Yes at Step S409), the control executing unit 225 executes the control action in response to the gesture made by the user to which the execution is determined as being permitted by the control-permission/denial determining unit 124 (Step S410).

When the control-permission/denial determining unit 124 determines that execution of the control action in response to the gesture is denied (No at Step S405), processing is terminated without executing the control action in response to the gesture. When the priority-level comparing unit 227 determines that the elapsed time is equal to or greater than the predetermined value (No at Step S406), the control executing unit 225 executes the control action in response to the gesture to which the execution is determined as being permitted by the control-permission/denial determining unit 124 (Step S410). When the priority-level comparing unit 227 determines that the priority level assigned to the role of the user in execution of the preceding control action is higher (No at Step S409), processing is terminated without executing the control action in response to such a gesture.

As described above, when a plurality of gestures are made within a predetermined period of time, the information processing apparatus 200 restricts execution of a control action in response to a gesture depending on priority levels assigned to roles. Accordingly, the information processing apparatus 200 is capable of preventing progress of a conference from being hindered by a gesture made by a user with a lower priority concurrently while another user with a higher priority level is making gestures successively.

Third Embodiment

Described in the second embodiment is the configuration in which, when one gesture is made within a predetermined period of time after a preceding control action is executed and execution of a control action in response to the one gesture is determined as being permitted, a priority level assigned to a role of a user, in response to which the preceding control action is executed, is compared to a priority level assigned to a role of a user that made the one gesture. In a third embodiment, when a plurality of users make gestures within a predetermined period of time, a control action to be executed is selected from among control actions in response to the gestures by comparing priority levels to one another.

Figure 13:
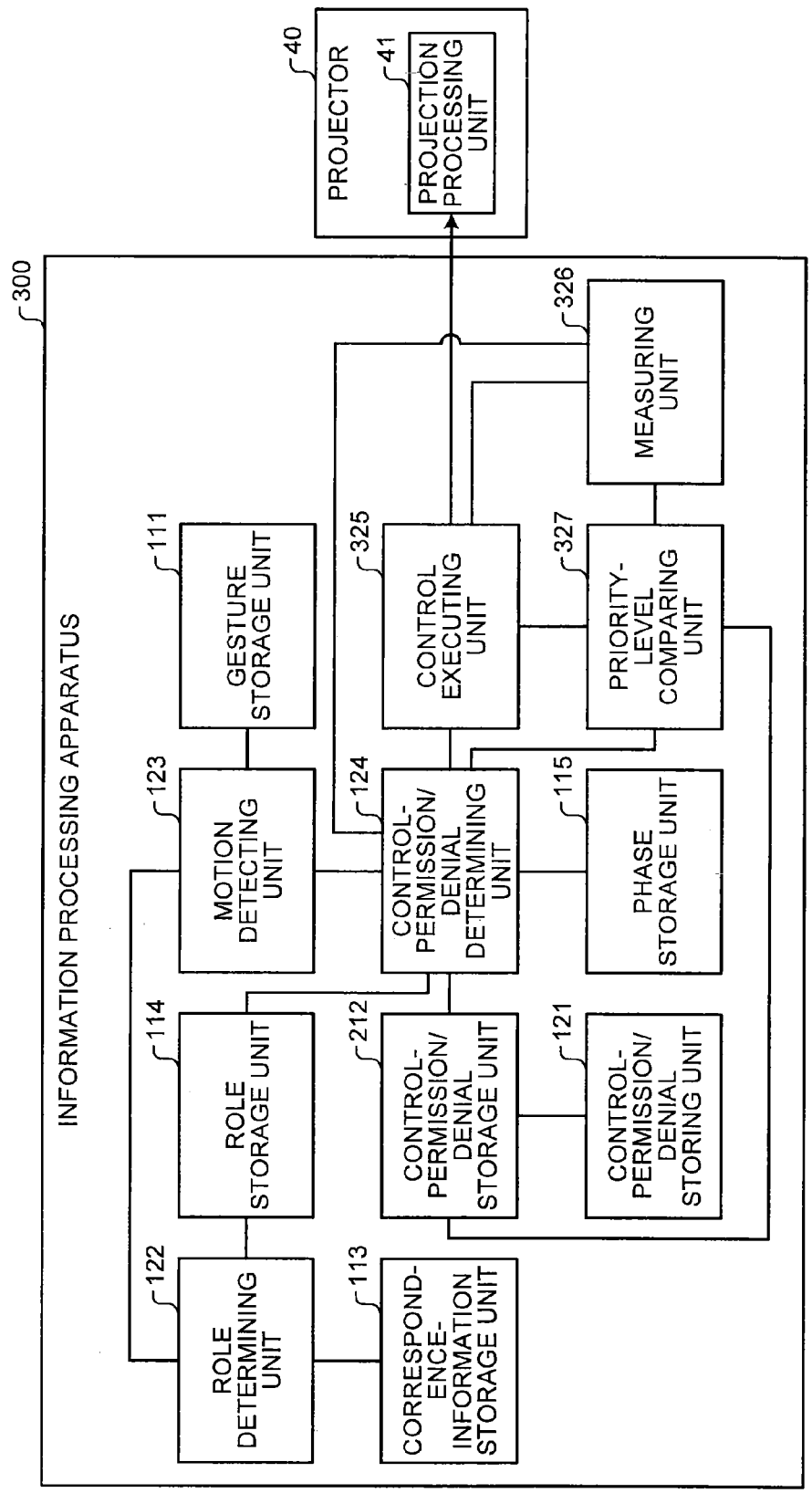
FIG. 13 is a functional block diagram illustrating an example configuration of an information processing apparatus according to a third embodiment.

The configuration of an information processing apparatus according to the third embodiment is described below with reference to FIG. 13. FIG. 13 is a functional block diagram illustrating an example configuration of the information processing apparatus according to the third embodiment. In FIG. 13, elements similar to those of the first embodiment or the second embodiment are denoted by like reference numerals and detailed description about such elements is omitted as appropriate. The third embodiment is similar to the first embodiment and the second embodiment in function, configuration, and operation of the units other than a control executing unit 325, a measuring unit 326, and a priority-level comparing unit 327, which are described below.

As illustrated in FIG. 13, an information processing apparatus 300 includes the gesture storage unit 111, the control-permission/denial storage unit 212, the correspondence-information storage unit 113, the role storage unit 114, and the phase storage unit 115. The information processing apparatus 300 further includes the control-permission/denial storing unit 121, the role determining unit 122, the motion detecting unit 123, the control-permission/denial determining unit 124, the control executing unit 325, the measuring unit 326, and the priority-level comparing unit 327.

The measuring unit 326 measures time elapsed since the control-permission/denial determining unit 124 determines that execution of a control action is permitted. The control-permission/denial determining unit 124 stores a role of a user, to which execution of the control action is determined as being permitted, in a predetermined memory. When the control-permission/denial determining unit 124 newly determines that execution of a control action is permitted before the elapsed time measured by the measuring unit 326 reaches a predetermined value, the priority-level comparing unit 327 obtains a priority level assigned to a role of a user, to which the execution is newly determined as being permitted, from the control-permission/denial storage unit 212. The priority-level comparing unit 327 obtains the role of the user that made the gesture, associated with the control action that is determined as being permitted next-most recently by the control-permission/denial determining unit 124, from the predetermined memory, and obtains a priority level assigned to the obtained role from the control-permission/denial storage unit 212. The priority-level comparing unit 327 compares the priority level assigned to the role of the user, to which the execution is newly determined as being permitted, to the priority level assigned to the role of the user, to which the execution is determined as being permitted next-most recently. The predetermined value is 5 seconds, for example.

When a result of the comparison output by the priority-level comparing unit 327 is that the priority level assigned to the role of the user, to which the execution is newly determined as being permitted, is higher, the control executing unit 325 executes only the control action in response to the gesture made by the user to which the execution is newly determined as being permitted. On the other hand, when the result of the comparison output by the priority-level comparing unit 327 is that the priority level assigned to the role of the user, to which the execution is determined as being permitted next-most recently, is higher, the control executing unit 325 executes only the control action in response to the gesture made by the user and determined as being permitted next-most recently. In short, the control executing unit 325 executes only a control action in response to a gesture made by a user determined as having a higher priority level based on a result of priority level comparison performed by the priority-level comparing unit 327.

When the control-permission/denial determining unit 124 does not determine that execution of a control action is permitted till a predetermined period of time has elapsed, the control executing unit 325 executes the control action in response to the gesture made by the user determined as being permitted most recently after the elapsed time has reached the predetermined value. On the other hand, when the control-permission/denial determining unit 124 newly determines that execution of a control action is permitted before the predetermined period of time elapses, the priority level comparison operation described above is performed after the elapsed time has reached the predetermined value. The predetermined period of time is the same as the predetermined value.

In other words, in the third embodiment, even when the control-permission/denial determining unit 124 determines that execution of a control action is permitted, the control action is not executed until the elapsed time reaches the predetermined value (the predetermined period of time). In addition, the priority level comparison operation is performed when the control-permission/denial determining unit 124 newly determines that execution of a control action is permitted before the time elapsed since the control-permission/denial determining unit 124 determines that execution of a control action is permitted reaches the predetermined value (the predetermined period of time), and only a control action in response to a gesture made by a user of a role with a higher priority level is executed.

The operations performed by the units described above are described below by way of examples. Described first is an example where the priority level assigned to the role of the user, to which execution of the control action is determined as being permitted next-most recently, is higher than the priority level assigned to the role of the user, to which execution of the control action is newly determined as being permitted.

For instance, the control-permission/denial determining unit 124 determines that execution of the control action in response to the gesture "gesture 1 (go to next page of material)" made by the role "explainer" in the phase "explaining" is permitted. The control-permission/denial determining unit 124 stores the role "explainer" of the user, to which execution of the control action is determined as being permitted, in a predetermined memory. At this time, the measuring unit 326 starts measuring time elapsed since the control permission/denial determining unit 124 determines that execution of the control action is permitted. Thereafter, while the elapsed time measured by the measuring unit 326 is smaller than "5 seconds", the control-permission/denial determining unit 124 newly determines that execution of the control action in response to the gesture "gesture 2 (go to previous page of material)" made by a user of the role "review leader" is permitted.

When the determination is made as described above by the control-permission/denial determining unit 124, the priority-level comparing unit 327 performs: obtaining the role "explainer" of the user, to which the execution is determined as being permitted next-most recently by the control-permission/denial determining unit 124; obtaining the priority level "1" assigned to the obtained role "explainer" from the control-permission/denial storage unit 212; and obtaining the priority level "2" assigned to the role "review leader" of the user, to which the execution is newly determined as being permitted by the control-permission/denial determining unit 124, from the control-permission/denial storage unit 212. The priority-level comparing unit 327 then compares the priority level "1" assigned to the role "explainer" to the priority level "2" assigned to the role "review leader" obtained from the control-permission/denial storage unit 212. The priority-level comparing unit 327 outputs to the control executing unit 325 a result of comparison that the priority level "1" assigned to the role "explainer" of the user, to the which execution is determined as being permitted next-most recently, is higher.

Upon receiving the result of comparison output by the priority-level comparing unit 327, the control executing unit 325 executes only the control action in response to the gesture "gesture 1 (go to next page of material)" made by the user of the role "explainer" to which execution of the control action is determined as being permitted next-most recently by the control-permission/denial determining unit 124. The control action is executed on the projector 40.

Described next is an example where the priority level assigned to the role of the user, to which execution of the control action is newly determined as being permitted, is higher than the priority level assigned to the role of the user, to which execution of the control action is determined as being permitted next-most recently.

For instance, the control-permission/denial determining unit 124 determines that execution of the control action in response to the gesture "gesture 1 (go to next page of material)" made by the role "explainer" in the phase "questioning-and-answering" is permitted. The control-permission/denial determining unit 124 stores the role "explainer" of the user, to which execution of the control action is determined as being permitted, in a predetermined memory. At this time, the measuring unit 326 starts measuring time elapsed since the control permission/denial determining unit 124 determines that execution of the first control action is permitted. Thereafter, while the elapsed time measured by the measuring unit 326 is smaller than "5 seconds", the control-permission/denial determining unit 124 newly determines that execution of the control action in response to the gesture "gesture 2 (go to previous page of material)" made by a user of the role "review leader" is permitted.

When the determination is made as described above by the control-permission/denial determining unit 124, the priority-level comparing unit 327 performs: obtaining the role "explainer" of the user, to which the execution is determined as being permitted next-most recently by the control-permission/denial determining unit 124; obtaining the priority level "2" assigned to the obtained role "explainer" from the control-permission/denial storage unit 212; and obtaining the priority level "1" assigned to the role "review leader" of the user, to which the execution is newly determined as being permitted by the control-permission/denial determining unit 124, from the control-permission/denial storage unit 212. The priority-level comparing unit 327 then compares the priority level "2" assigned to the role "explainer" to the priority level "1" assigned to the role "review leader" obtained from the control-permission/denial storage unit 212. The priority-level comparing unit 327 outputs to the control executing unit 325 a result of comparison that the priority level "1" assigned to the role "review leader" of the user, to which the execution is newly determined as being permitted, is higher.

Upon receiving the result of comparison output by the priority-level comparing unit 327, the control executing unit 325 executes only the control action in response to the gesture "gesture 2 (go to previous page of material)" made by the user of the role "review leader" to which execution of the control action is newly determined as being permitted by the control-permission/denial determining unit 124. The control action is executed on the projector 40.

Figure 14:
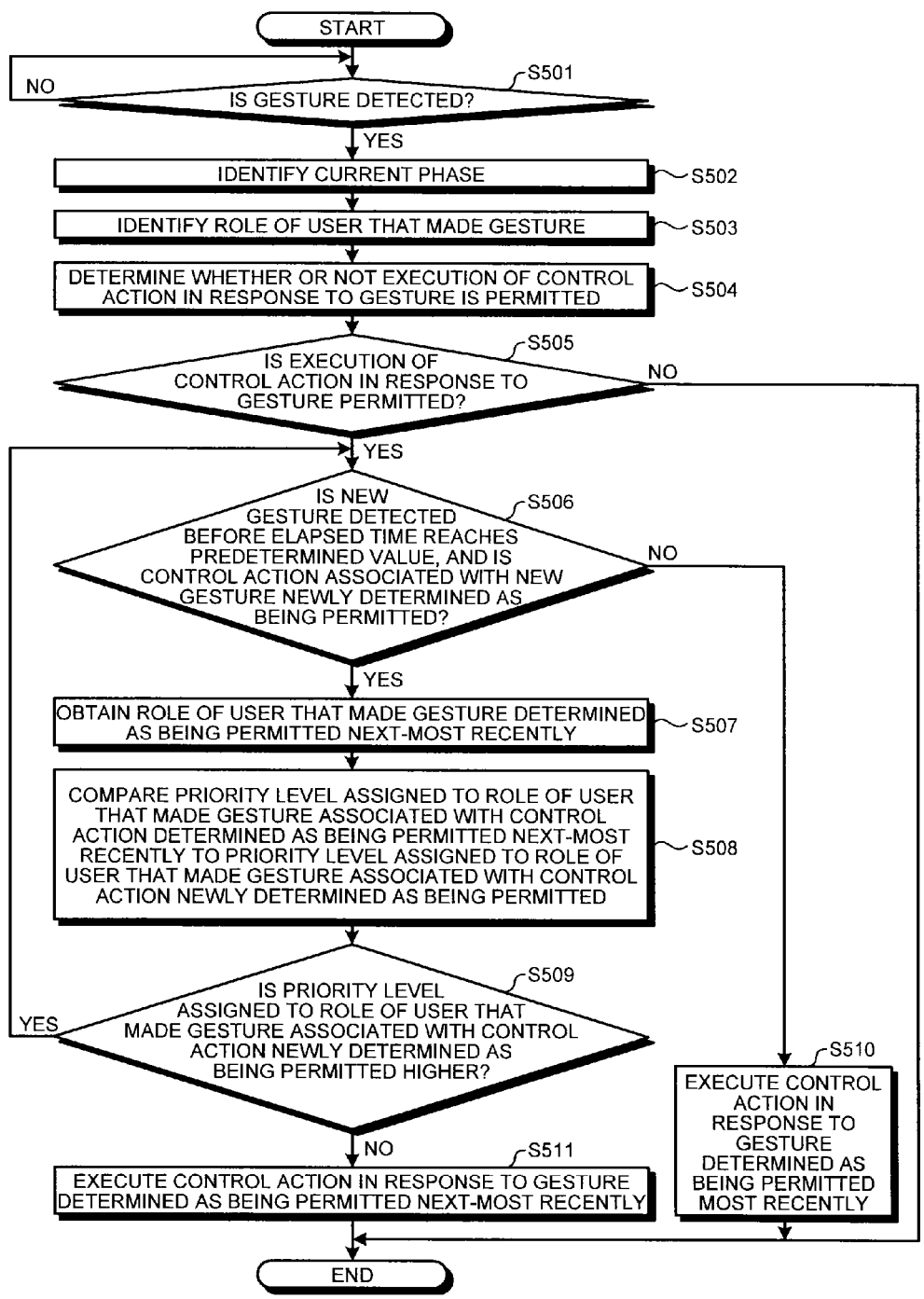
FIG. 14 is a flowchart illustrating an example of a flow of overall operations according to the third embodiment.

A flow of overall operations according to the third embodiment is described below with reference to FIG. 14. FIG. 14 is a flowchart illustrating an example of the flow of the overall operations according to the third embodiment. Note that operations similar to a part of the overall operations according to the first embodiment are omitted as appropriate. Specifically, operations to be performed at Steps S501 to S504 are similar to the operations performed at Steps S101 to S104.

As illustrated in FIG. 14, when the control-permission/denial determining unit 124 determines that execution of a control action in response to a gesture is permitted (Yes at Step S505), the priority-level comparing unit 327 determines whether a control action in response to a new gesture is newly determined as being permitted while elapsed time measured by the measuring unit 326 is smaller than a predetermined value (Step S506). At this time, when the priority-level comparing unit 327 determines that execution of a control action is newly determined as being permitted (Yes at Step S506), the priority-level comparing unit 327 obtains a role of a user that made the gesture, with which the control action determined as being permitted next-most recently is associated, from the predetermined memory (Step S507).

On the other hand, when the control-permission/denial determining unit 124 determines that execution of the first control action in response to the gesture is denied (No at Step S505), processing is terminated without executing the control action in response to the gesture. When there is no control action in response to a new gesture and determined as being permitted while the elapsed time is smaller than the predetermined value (No at Step S506), the control executing unit 325 executes the control action in response to the gesture made by the user that is determined as being permitted (most recently) at this point in time (Step S510).

The priority-level comparing unit 327 obtains the priority level assigned to the role of the user that made the gesture, with which the control action determined as being permitted next-most recently is associated, and the priority level assigned to the role of the user that made the gesture, with which the control action newly determined as being permitted by the control-permission/denial determining unit 124 is associated, from the control-permission/denial storage unit 212 and performs comparison between the obtained priority levels (Step S508). When a result of the comparison by the priority-level comparing unit 327 is that the priority level assigned to the role of the user, to which the execution is determined as being permitted next-most recently, is higher (No at Step S509), the control executing unit 325 executes the control action in response to the gesture made by the user to which the execution is determined as being permitted by the control-permission/denial determining unit 124 next-most recently (Step S511).

On the other hand, when the result of the comparison by the priority-level comparing unit 327 is that the priority level assigned to the role of the user, to which the execution is newly determined as being permitted, is higher (Yes at Step S509), the operation at Step S506 is performed again. More specifically, the operation at Step S506 is performed again to determine whether or not execution of still another control action in response to another new gesture is permitted before the time elapsed since the execution is newly determined as being permitted and measured by the measuring unit 326 reaches the predetermined value.

As described above, even when execution of a control action in response to a gesture made by a user is determined as being permitted, the information processing apparatus 300 waits for the predetermined period of time before executing the control action. When execution of another control action in response to another gesture is determined as being permitted within the predetermined period of time, the information processing apparatus 300 executes only one of the control actions that is associated with a gesture made by a user of a role higher in priority level. Accordingly, in a situation where a user with a higher priority level makes a gesture immediately after a user with a lower priority level has made a gesture, the information processing apparatus 300 cancels the control action in response to the gesture made earlier by the user with the lower priority level, thereby preventing progress of a conference from being hindered.

Fourth Embodiment

The information processing apparatus 100, the information processing apparatus 200, and the information processing apparatus 300 according to the embodiments of the present invention have been described. Various embodiments other than those described above may be implemented. Described below are embodiments that differ in (1) allowing user to play combined role; (2) switching phase in response to gesture; (3) determining role based on biometric data; (4) configuration; and (5) program instructions.

(1) Allowing User to Play Combined Role

Figure 15:
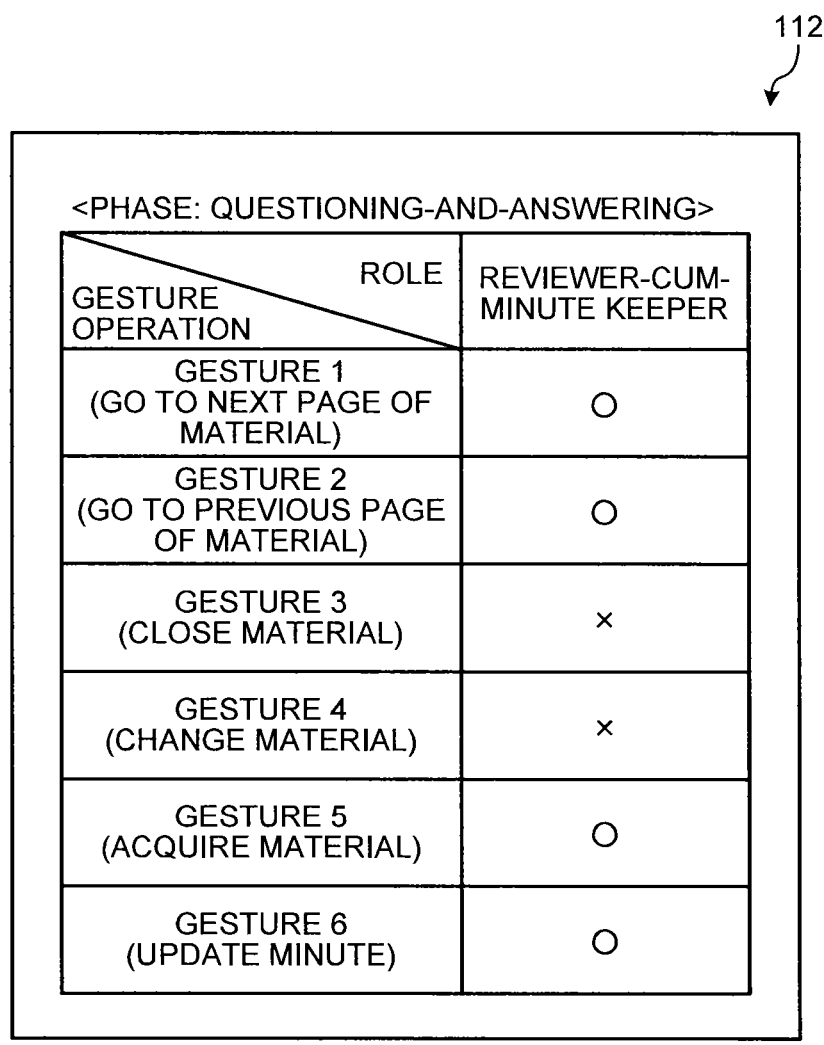
FIG. 15 is a diagram illustrating an example of information stored in the control-permission/denial storage unit in a case where a user plays a combined role according to a fourth embodiment.

In the embodiments described above, one role is assigned to each user; alternatively, a user may play a combined role in which multiple roles are combined. FIG. 15 is a diagram illustrating an example of information stored in the control-permission/denial storage unit 112 in a case where a user plays a combined role according to a fourth embodiment. Note that whereas FIG. 15 illustrates only permission/denial information for the conference phase "questioning-and-answering", in practice, permission/denial information for the conference phases "preparing", "explaining", and "summarizing" is also stored in the control-permission/denial storage unit 112.

As illustrated in FIG. 15, the control-permission/denial storage unit 112 stores therein permission/denial information "o (permitted)" or "x (denied)" as to whether or not to permit execution of each of the control actions in response to the respective gestures "gesture 1 (go to next page of material)", "gesture 2 (go to previous page of material)", "gesture 3 (close material)", "gesture 4 (change material)", "gesture 5 (acquire material)", and "gesture 6 (update minute)" to a user' role "reviewer-cum-minute keeper" in the conference phase "questioning-and-answering".

Because a user can play a combined role, the correspondence-information storage unit 113 stores therein area locations of predetermined regions in a conference room where the conference is held, and combined roles assigned to the respective area locations in the conference in a manner associated with each other. The role determining unit 122 determines combined roles of respective users by obtaining a combined role associated with an area including a location of each user detected by the motion detecting unit 123 from the correspondence-information storage unit 113, and stores the determined combined roles of the users together with the location information in the role storage unit 114.

Similarly, because a user can play a combined role, the control-permission/denial determining unit 124 obtains a combined role associated with a location of a user that made a gesture detected by the motion detecting unit 123 from the role storage unit 114, thereby identifying the combined role of the user. The control-permission/denial determining unit 124 determines whether execution of a control action in response to the gesture detected by the motion detecting unit 123 is permitted to the identified combined role of the user in the current phase by accessing the control-permission/denial storage unit 112.

(2) Switching Phase in Response to Gesture

Figures 16, 17:
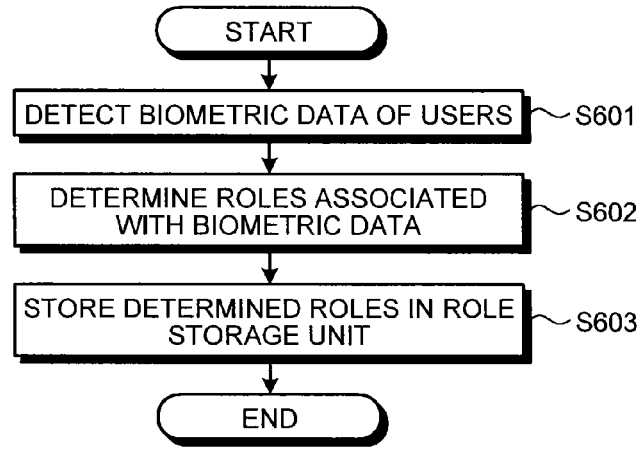
FIG. 16 is a diagram illustrating an example of information stored in the control-permission/denial storage unit in a case where a phase is switched in response to a gesture according to the fourth embodiment.
FIG. 17 is a flowchart illustrating an example of a flow of a role determining operation according to the fourth embodiment.

In the embodiments described above, the conference phase is changed depending on time elapsed since conference start time. Alternatively, a configuration in which a phase is changed in response to a gesture made by a user may be employed. FIG. 16 is a diagram illustrating an example of information stored in the control-permission/denial storage unit 112 in a case where a phase is switched in response to a gesture according to the fourth embodiment. Note that whereas FIG. 16 illustrates only permission/denial information for the conference phase "explaining", in practice, permission/denial information for the conference phases "preparing", "questioning-and-answering", and "summarizing" is also stored in the control-permission/denial storage unit 112.

As illustrated in FIG. 16, the control-permission/denial storage unit 112 stores therein permission/denial information "o (permitted)" or "x (denied)" as to whether or not to permit execution of each of the control actions in response to the respective gestures "gesture 1 (go to next page of material)", "gesture 2 (go to previous page of material)", "gesture 3 (close material)", "gesture 4 (change material)", "gesture 5 (acquire material)", "gesture 6 (update minute)", and "gesture 7 (advance phase)" to respective users' roles "advancer", "explainer", "review leader", "reviewer", and "minute keeper" in the conference phase "explaining".

The role "advancer" and the gesture "gesture 7 (advance phase)" are added to the control-permission/denial storage unit 112 for phase advancement. When the control-permission/denial determining unit 124 determines that execution of the control action in response to the gesture "gesture 7 (advance phase)" is permitted, the control executing unit 125 causes a current phase to advance to a next phase by referring to the "ordinal number" from the phase storage unit 115. The current phase is preferably stored in the phase storage unit 115 at this time. Information about the current phase stored in the phase storage unit 115 is updated in response to a gesture for phase advancement. Not only the gesture for phase advancement but also a special gesture to switch a phase to a specific phase may be provided. When provided with such a special gesture, jump from a current phase to the specific phase becomes possible. More specifically, it may become possible to perform phase switching in an exact order of "explaining", "questioning-and-answering", "explaining", and "summarizing". Meanwhile, it is not essential that only a user of which role is "advancer" performs the phase switching. A configuration in which a user of other role serves to perform the phase switching may be employed.

(3) Determining Role Based on Biometric Data

In the embodiments described above, roles of respective users are determined based on locations of the users. Alternatively, a configuration in which roles of users are fixed in advance, and the roles of the users are determined by performing a lookup using biometric data of the user can be employed. In a case where biometric data are utilized, the correspondence-information storage unit 113 stores therein biometric data of each of users participating in a conference and roles of the users in the conference in a manner associated with each other.

FIG. 17 is a flowchart illustrating an example of a flow of a role determining operation according to the fourth embodiment. As illustrated in FIG. 17, the motion detecting unit 123 receives an image captured by the camera 30 and detects a location and biometric data of each of users from the received image (Step S601). The biometric data can be detected by utilizing a face recognition technology, for example. The role determining unit 122 determines a role of each of the users by obtaining a role associated with biometric data of the user detected by the motion detecting unit 123 from the correspondence-information storage unit 113 (Step S602). The role determining unit 122 stores therein the determined roles of the respective users in the role storage unit 114 together with the location information and the biometric data (Step S603).

In a situation where a user plays a combined role as described above, the correspondence-information storage unit 113 stores therein biometric data of each of users participating in a conference and the combined roles of the respective users in a manner associated with each other. The role determining unit 122 determines combined roles of the respective users at respective locations by obtaining a combined role associated with biometric data of each of the users detected by the motion detecting unit 123, from the correspondence-information storage unit 113. The role determining unit 122 stores the determined combined roles of the respective users in the role storage unit 114 together with the location information and the biometric data. The role determining unit 122 determines the combined roles of the users as appropriate. Accordingly, the control-permission/denial determining unit 124 obtains a role associated with biometric data or location of a user that made a gesture detected by the motion detecting unit 123, from the role storage unit 114, thereby identifying the role of the user.

(4) Configuration

The operation procedures, control procedures, specific names, and information including various data and parameters denoted in the above description, drawings, and the like can be arbitrarily modified unless otherwise specified. For example, information displayed on the control-permission/denial entering screen or information stored in the control-permission/denial storage unit 112 (the control-permission/denial storage unit 212) is not limited to those described above, but may be modified as appropriate. Specifically, the control-permission/denial entering screen may be configured in such a manner that a plurality of items can be selected at a time so that whether or not execution of control actions is permitted can be determined at a time. The control-permission/denial storage unit 112 has been described to store therein the permission/denial information that varies from one phase to another. Alternatively, the control-permission/denial storage unit 112 may store therein permission/denial information that is identical among different phases. Put another way, it is not requisite to store permission/denial information for each of the phases. The priority levels to be stored in the control-permission/denial storage unit 212 are not limited to those illustrated in the drawings but may be changed according to roles as appropriate.

The respective components of the information processing apparatus 100, the information processing apparatus 200, and the information processing apparatus 300 illustrated in the drawings are functionally conceptual and are not necessarily physically configured as illustrated in the drawings. More specifically, specific forms of distribution and integration of apparatuses are not limited to those illustrated in the drawings. All or a part of the apparatuses can be functionally or physically distributed or integrated in any unit(s) depending on various loads, a usage pattern, and the like. For example, the motion detecting unit 123 may be separated to a "locating unit" that detects a location of a user from an image captured by the camera 30 and a "gesture detecting unit" that detects a gesture made by a user from images captured by the camera 30.

(5) Program Instructions

The information processing apparatus 100 according to the embodiment may have the hardware configuration implemented in a typical computer and include a control device such as a central processing unit (CPU), a storage device such as a read only memory (ROM) and/or a random access memory (RAM), an external storage device such as a hard disk drive (HDD) and/or a compact disc (CD) drive, a display device, and an input device such as a keyboard and/or a mouse.

Program instructions for information processing for execution by the information processing apparatus 100 according to the embodiment are provided as a computer program product including a non-transitory tangible computer-readable storage medium in which the program instructions are stored as a file in an installable format or an executable format. The non-transitory tangible computer-readable storage medium may be, for instance, a compact disk read only memory (CD-ROM), a flexible disk (FD), a compact disk recordable (CD-R), or a digital versatile disk (DVD).

The program instructions for information processing for execution by the information processing apparatus 100 according to the embodiment may be configured to be stored in a computer connected to a network such as the Internet and provided by downloading over the network. Further, the program instructions for information processing may be configured to be provided or distributed via the network such as the Internet. The program instructions for information processing may be configured to be provided as being installed in a ROM or the like in advance.

The program instructions for information processing for execution by the information processing apparatus 100 according to the embodiment have a module structure including the units described above (the motion detecting unit 123 and the control-permission/denial determining unit 124). From the viewpoint of actual hardware, the CPU (processor) reads out the program instructions for information processing from the storage medium and executes the program instructions to load the units on a main memory device, thereby generating the motion detecting unit 123 and the control-permission/denial determining unit 124 on the main memory device.

According to an aspect of the embodiments, it is possible to grant an operation authority appropriately in a technique to implement an operation in response to a gesture by a user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a memory that stores therein permission/denial information as to whether or not execution of respective control actions in response to a predetermined motions made by users is permitted to the roles of the users for each of a plurality of stages of progress of a conference for which the information processing apparatus is utilized; and
circuitry configured to:
detect a predetermined motion from images captured by an image capturing device; and
determine whether or not execution of a control action in response to a predetermined motion made by a user and detected by the circuitry is permitted to a role of the user at a current stage of progress of the conference based on the permission/denial information stored in the memory,
wherein when the circuitry determines that execution of the control action in response to a predetermined motion made by a user is permitted, the circuitry executes the control action,
the memory further stores therein priority levels in terms of execution of the respective control actions as assigned to the roles, the priority levels varying depending on a stage of progress of the conference for which the information processing apparatus is utilized, and the circuitry measures time elapsed since a preceding control action is executed,
when the circuitry determines that execution of a current control action in response to a predetermined motion is permitted and the elapsed time measured by the circuitry has not reached a predetermined value,
the circuitry compares a first priority level, for a current stage of progress of the conference assigned to a role of a first user that made predetermined motion to which the execution of the current control action is determined as being permitted,
to a second priority level for the current stage of progress of the conference assigned to a role of a second user that made a predetermined motion, in response to which the preceding control action is executed by the circuitry, and
the circuitry executes the current control action when a result of comparison by the circuitry is that the first priority level is higher than the second priority level assigned to the role of the second user, and
the circuitry does not execute the current control action when a result of comparison by the circuitry is that the first priority level assigned to the role of the first user is not higher than the second priority level assigned to the role of the second user, and
when the circuitry determines that execution of the current control action in response to a predetermined motion is permitted and the elapsed time measured by the circuitry has already reached the predetermined value,
the circuitry executes the current control action in response to the predetermined motion made by the first user.

2. The information processing apparatus according to claim 1, wherein
the circuitry detects locations of the users from an image captured by the image capturing device,
the memory stores therein correspondence information in which the locations of the users and the roles assigned to the locations are associated with each other,
the circuitry determines a role of a user based on a detected location of the user and the correspondence information, and controls storage of the determined role in the memory, and
the circuitry identifies the role of the user based on the determined role stored in the memory, and determines whether or not execution of the control action in response to a predetermined motion made by the user is permitted to the identified role of the user based on the permission/denial information.

3. The information processing apparatus according to claim 2, wherein
the memory stores therein correspondence information in which a location of a user and a combined role assigned to the location of the user are associated with each other, and
the circuitry determines the combined role of the user based on the detected location of the user and the correspondence information, and stores the determined combined role in the memory.

4. The information processing apparatus according to claim 1, wherein
the circuitry detects biometric data of a user from an image captured by the image capturing device,
the memory stores therein correspondence information in which biometric data of the users and the roles assigned to the biometric data of the users are associated with each other,
the circuitry determines a role of a user based on biometric data of the user detected by the circuitry and the correspondence information, and stores the determined role in the memory, and
the circuitry identifies the role of the user based on the determined role stored in the memory, and determines whether or not execution of the control action in response to a predetermined motion made by the user is permitted to the identified role of the user based on the permission/denial information.

5. The information processing apparatus according to claim 4, wherein
the memory stores therein correspondence information in which biometric data of a user and a combined role assigned to the biometric data of the user are associated with each other, and
the circuitry determines the combined role of the user based on the biometric data of the user detected by the circuitry and the correspondence information, and stores the determined combined role in the memory.

6. The information processing apparatus according to claim 1, wherein
the memory stores therein permission/denial information as to whether or not execution of a control action in response to a predetermined motion made by a user is permitted to a combined role of the user, and
the circuitry determines whether or not execution of a control action in response to a predetermined motion made by a user and detected by the circuitry is permitted to the combined role of the user based on the permission/denial information.

7. The information processing apparatus according to claim 1, wherein
the circuitry determines whether or not execution of a control action to cause a current stage of progress of the conference, for which the information processing apparatus is used, to advance is permitted to a role of a user based on the permission/denial information, the user making a predetermined motion associated with the control action, and
the circuitry causes the current stage of progress to advance to a next stage of progress when the circuitry determines that execution of the control action in response to the predetermined motion to cause the current stage of progress to advance is permitted.

8. The information processing apparatus according to claim 1, wherein the memory stores therein stages of progress of the conference, for which the information processing apparatus is utilized, and time periods assigned to the respective stages of progress, wherein
the circuitry obtains a current stage of progress from the memory according to time elapsed since start time of the job, and determines whether or not execution of a control action in response to a predetermined motion made by a user is permitted to a role of the user at the current stage of progress based on the permission/denial information.

9. A projection system including an information processing apparatus and a projection apparatus, the projection system comprising:
a memory that stores therein permission/denial information as to whether or not execution of respective control actions in response to predetermined motions made by users is permitted to the roles of the users for each of a plurality of stages of progress of a conference for which the information processing apparatus is utilized; and
circuitry configured to:
detect a predetermined motion from images captured by an image capturing device;
determine whether or not execution of a control action in response to a predetermined motion made by a user and detected by the circuitry is permitted to a role of the user at a current stage of progress of the conference based on the permission/denial information stored in the memory;
when the circuitry determines that execution of the control action is permitted, execute the control action in response to the predetermined motion made by the user; and
control a projecting operation according to the executed control action,
the memory further stores therein priority levels in terms of execution of the respective control actions as assigned to the roles, the priority levels varying depending on a stage of progress of the conference for which the information processing apparatus is utilized, and the circuitry measures time elapsed since a preceding control action is executed,
when the circuitry determines that execution of a current control action in response to a predetermined motion is permitted and the elapsed time measured by the circuitry has not reached a predetermined value,
the circuitry compares a first priority level, for a current stage of progress of the conference assigned to a role of a first user that made predetermined motion to which the execution of the current control action is determined as being permitted,
to a second priority level for the current stage of progress of the conference assigned to a role of a second user that made a predetermined motion, in response to which the preceding control action is executed by the circuitry, and
the circuitry executes the current control action when a result of comparison by the circuitry is that the first priority level is higher than the second priority level assigned to the role of the second user, and
the circuitry does not execute the current control action when a result of comparison by the circuitry is that the first priority level assigned to the role of the first user is not higher than the second priority level assigned to the role of the second user, and
when the circuitry determines that execution of the current control action in response to a predetermined motion is permitted and the elapsed time measured by the circuitry has already reached the predetermined value,
the circuitry executes the current control action in response to the predetermined motion made by the first user.

10. An information processing method comprising:
storing, in a non-transitory memory, permission/denial information as to whether or not execution of respective control actions in response to a predetermined motions made by users is permitted to the roles of the users for each of a plurality of stages of progress of a conference for which the information processing apparatus is utilized;

detecting a predetermined motion from images captured by an image capturing device; and determining whether or not execution of a control action in response to the detected predetermined motion made by a user is permitted to a role of the user at a current stage of progress of the conference based on the permission/denial information stored in the memory, wherein the method further comprises:

determining that execution of the control action in response to a predetermined motion made by a user is permitted, the circuitry executes the control action, storing, in the memory, therein priority levels in terms of execution of the respective control actions as assigned to the roles, the priority levels varying depending on a stage of progress of the conference for which the information processing apparatus is utilized, and the method includes measuring time elapsed since a preceding control action is executed, when it is determined that execution of a current control action in response to a predetermined motion is permitted and the elapsed time measured by the circuitry has not reached a predetermined value, comparing a first priority level, for a current stage of progress of the conference assigned to a role of a first user that made the predetermined motion to which the execution of the current control action is determined as being permitted, to a second priority level for the current stage of progress of the conference assigned to a role of a second user that made a predetermined motion, in response to which the preceding control action is executed by the circuitry, executing the current control action when a result of comparison by the circuitry is that the first priority level is higher than the second priority level assigned to the role of the second user, and preventing execution of the current control action when a result of comparison by the circuitry is that the first priority level is not higher than the second priority level assigned to the role of the second user, and when it is determined that execution of the current control action in response to a predetermined motion is permitted and the elapsed time measured by the circuitry has already reached the predetermined value, executing the current control action in response to the predetermined motion made by the first user.

* * * * *